United States Patent [19]
Kato et al.

[11] Patent Number: 4,810,377
[45] Date of Patent: Mar. 7, 1989

[54] CLARIFICATION DEVICE

[75] Inventors: Minoru Kato, Ohmiya; Sohei Okamoto, Musashino; Yukio Suzuki, Tokyo, all of Japan

[73] Assignee: Kabushiki Kaisha Iseki Kaihatsu Koki, Tokyo, Japan

[21] Appl. No.: 95,579

[22] Filed: Sep. 10, 1987

[30] Foreign Application Priority Data

Sep. 11, 1986 [JP] Japan .................................. 61-212764

[51] Int. Cl.⁴ .............................. C02F 3/06; C02F 3/10
[52] U.S. Cl. .................................... 210/150; 210/170; 210/232
[58] Field of Search ................. 210/150, 151, 616–618, 210/170, 747, 232

[56] References Cited

U.S. PATENT DOCUMENTS

| 3,878,097 | 4/1975 | Mochizuki et al. | 210/151 |
| 4,141,823 | 2/1979 | Smith et al. | 210/150 |
| 4,488,960 | 12/1984 | Goerlich | 210/151 |

FOREIGN PATENT DOCUMENTS

| 3235600 | 3/1984 | Fed. Rep. of Germany | 210/617 |
| 3522241 | 1/1987 | Fed. Rep. of Germany | 210/618 |
| 61-157396 | 7/1986 | Japan | 210/151 |
| 1074834 | 2/1984 | U.S.S.R. | 210/151 |

Primary Examiner—Benoit Castel
Attorney, Agent, or Firm—Graybeal, Jensen & Puntigam

[57] ABSTRACT

A clarification device comprises a purifier tank having an opening at its top and an inlet and an outlet for sewage, at least one contact means to which microorganisms for purification are to be attached and which is disposed in the purifier tank at position spaced upwardly from a bottom of the purifier tank, and air-flowing means disposed between the contact means and the bottom of the tank, air-supplying means extending vertically in the purifier tank for supplying air to the air-flowing means. The contact means includes a first assembly disposed at the inlet side so as to be removed out of the tank through the opening, and a second assembly disposed at the outlet side of the first assembly so as to be removed out of the tank through the opening. The clarification device further comprises means for closing the opening of the purifier tank. The closing means includes a detachable first closure disposed above the first assembly for covering a first part of the opening, and a detachable second closure disposed above the second assembly for covering a second part of the opening.

11 Claims, 9 Drawing Sheets

CLARIFICATION DEVICE

BACKGROUND OF THE INVENTION

1. Field of the Invention

This invention relates to a device suitable for clarifying sewage containing organic matter, such as industrial waste water and living waste water, and more particularly to a clarification device of contact aeration type which is easy to inspect and repair.

2. Description of the Prior Art

One purifier of contact aeration type is known which comprises a purifier tank having an opening at its top and including an inlet and an outlet adjacent to the opening for sewage, at least one contact member disposed in the purifier tank, at least one air-flowing pipe disposed at the bottom of the purifier tank, and a closure for closing the opening. In this type of purifier, inspections are to be conducted on the opening condition of the air flowing pipe as well as on the condition in which the contact members are choked up due to growth of microorganisms attached to the contact members, then the purifier is repaired if necessary.

A problem with this prior art purifier is that since a space is provided in the purifier tank and filled with the contact members including contact material, such as small stones and foamed plastic material, it is necessary to remove all the contact members from the purifier tank, or the worker must step into the bottom of the purifier tank in order to inspect and repair the air-flowing pipe (if the latter is disposed below the contact members), which are laborious.

Further, generally in the prior art purifier, the closure covering the opening of the purifier tank is fixed to the tank and is provided with a manhole for maintenance and care. With this prior arrangement, if the contact members are large in size, the closure must be broken to take the contact members out of the tank. Yet, if the contact members are small in size, they are necessarily large in number, which takes a long time to take them out of the tank.

SUMMARY OF THE INVENTION

It is therefore an object of the present invention to provide a clarification device in which contact members can be removed with ease, thus causing easy maintenance and care.

According to a first aspect of the present invention, a device for clarifying sewage comprises a clarification tank or purifier tank having an opening at its top and an inlet and an outlet for said sewage, contact means to which microorganisms for purification are to be attached and which is disposed in the purifier tank at a position spaced upwardly from a bottom of the purifier tank, air-flowing means disposed between the contact means and the bottom of the tank, and air-supplying means extending vertically in the purifier tank for supplying air to the air-flowing means. The contact means is divided into a plurality of assemblies so as to be removed from the purifier tank through the opening.

According to a second aspect of the present invention, a device for clarifying sewage comprises a clarification tank or purifier tank having an opening at its top and an inlet and an outlet for sewage, at least one contact means to which microorganisms for purification are to be attached and which is disposed in the purifier tank at a position spaced upwardly from a bottom of the purifier tank, air flowing means disposed between the contact means and the bottom of the tank, air-supplying means extending vertically in the purifier tank for supplying air to the air-flowing means, and means for closing the opening of the purifier tank. The contact means includes a first assembly disposed at the inlet side so as to be removed out of the tank through the opening, and a second assembly disposed at the outlet side of the first assembly so as to be removed out of the tank through the opening. The closing means includes a detachable first closure disposed above the first assembly for covering a first part of the opening, and a detachable second closure disposed above the second assembly for covering a second part of the opening.

The sewage on the bottom of the purifier tank rises due to air blown out from the air-flowing means disposed on the bottom of the tank and flows upwardly, while the sewage at the top of the tank sinks by its own weight. Further, the sewage in the purifier tank flows downwardly or upwardly while it contacts the contact means. Therefore, the sewage introduced from the inlet to the purifier tank receives the action of purification from aerobic microorganisms (or anaerobic microorganisms) while it flows in the purifier tank and then finally flows out of the purifier tank from the outlet. A particular assembly is taken one by one out of the purifier tank to be inspected and repaired. Further, one or a plurality of assemblies corresponding to the contact means and air-flowing means to be repaired is taken out.

According to the present invention, since the contact means is divided into a plurality of assemblies, it is enough to take out of the purifier tank only the particular assembly to be inspected and repaired, and it is enough to take out only the particular assembly corresponding to the contact means or the air-flowing pipe to be repaired. Therefore, easy maintenance can be achieved.

Further, since the closing means covering the opening of the purifier tank is divided into a plurality of detachable closures individually corresponding to the assemblies, any assembly can be removed out of the tank with ease.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
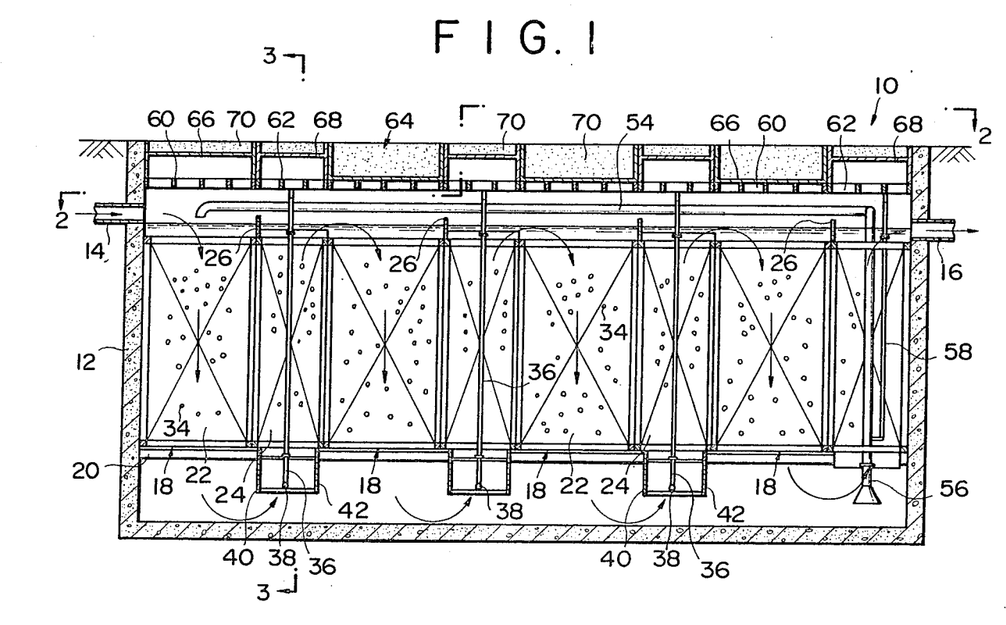
FIG. 1 is a vertical cross-sectional view showing an embodiment of a clarification device according to the present invention.
Figure 2:
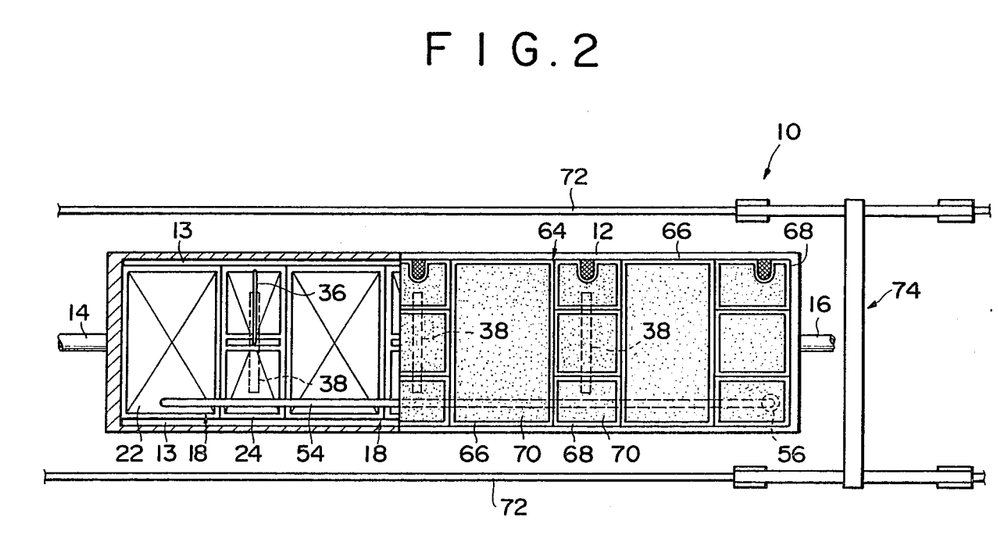
FIG. 2 is a cross-sectional view taken along line 2—2 of FIG. 1.
Figure 3:
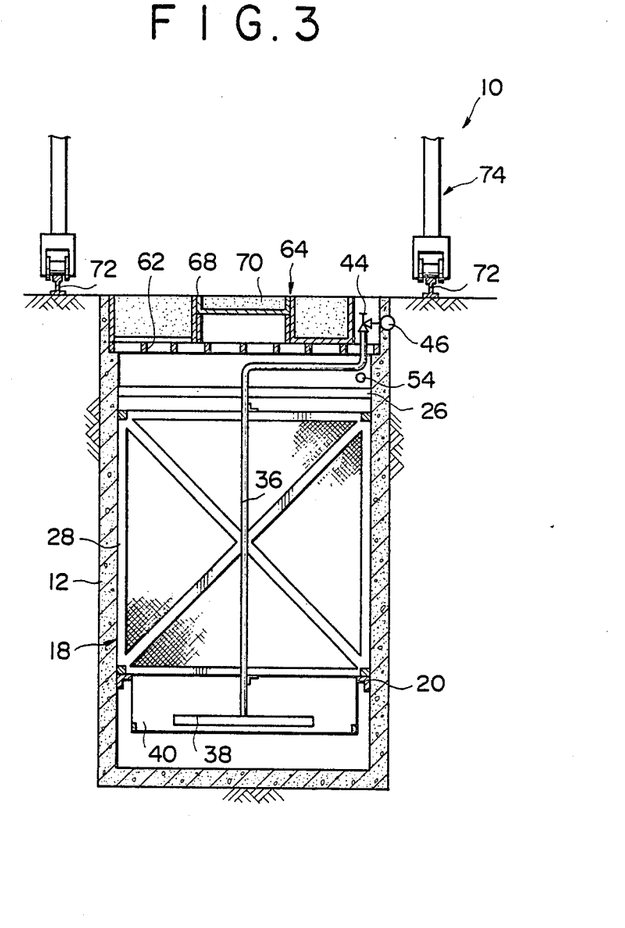
FIG. 3 is a cross-sectional view taken along line 3—3 of FIG. 1.

FIGS. 1 through 3 illustrate a sewage purifier or clarification device 10 of contact aeration type which comprises a clarification tank or purifier tank 12 of steel, concrete or synthetic resin. The purifier tank 12 is in the form of an elongated box having an opening at its top. Although the purifier tank 12 is embedded wholly in the ground in the illustrated embodiment, it may be exposed above the ground wholly or in part.

The purifier tank 12 has at one end an inlet 14 for sewage and at the other end an outlet 16 for treated sewage. In the illustrated example, each of the inlet 14 and the outlet 16 is defined by a pipe extending through a side wall of the purifier tank 12. Although the inlet 14 and outlet 16 are disposed at the top of the purifier tank 12, they may be disposed at a bottom of the tank 12, in which case it is preferable that additional pipes are used to introduce sewage to the inlet 14 and to discharge sewage from the outlet 16 to the exterior of the purifier tank 12.

A plurality (four in the illustrated example) of contact members 18 is disposed in the purifier tank 12 at a position spaced upwardly a predetermined distance from the bottom of the tank 12, being arranged in succession from the inlet side to the outlet side. Each of the contact members 18 is detachably supported on a pair of angled bars 20,20 fixed to the side wall of the purifier tank 12, the contact members 18 being in contact with one another. Each contact member 18 includes a first assembly 22 disposed at the inlet side so as to be removed out of the purifier tank 12 through the opening, a second assembly 24 disposed at the outlet side of the first assembly 22 so as to be removed, independently of the first assembly 22, out of the tank 12 through the opening, and a partition 26 for preventing sewage at an upper portion of the first assembly 22 from floating directly to an upper portion of the second assembly 24.

Figure 4:
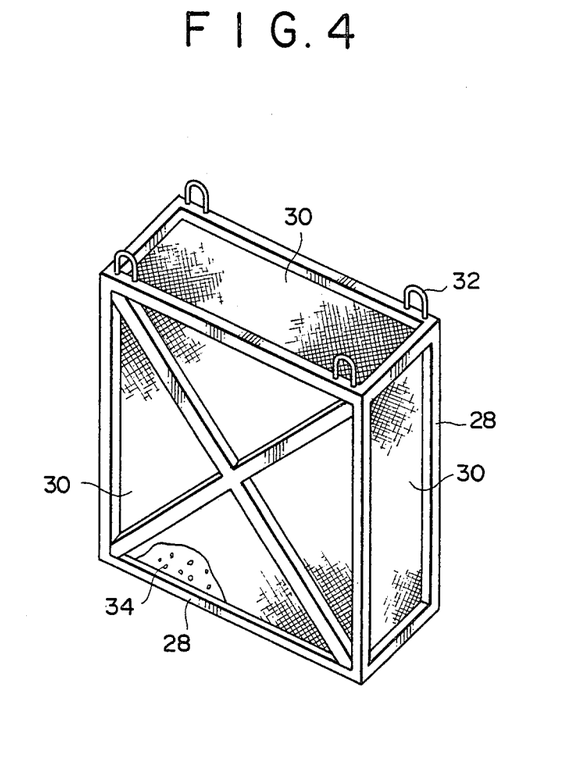
FIG. 4 is a perspective view showing an example of a framework of a contact member.

Each of the first and second assemblies 22,24, as shown in FIG. 4 in which only the first assembly 22 is illustrated, includes a framework 28 in the form of a rectangular parallelepiped composed of a plurality of elongated frame members, a plurality of nets 30 each covering a respective one of openings in the framework 28, and a plurality of arch-shaped engaging members 32 mounted on the top of the framework 28. Each assembly 22,24 may be subdivided. The framework 28 may be composed of plates, in which case the framework 28 has openings extending vertically with nets disposed only at the top and bottom of the framework 28.

A plurality of contact materials 34 is received in a space defined by the nets 30 of each assembly 22,24. Each of the contact materials 34 comprises a small mass of plastic material floatable in water. The contact materials 34 are contained in this space so as to suspend or float in response to the flow of sewage. Alternatively, the contact materials 34 may be contained in the space so as not to suspend or float. Further, the contact materials 34 may comprises light aggregate, small stones, foamed plastic. honeycomb-shaped plastic, sponge-shaped plastic or other suitable material. In the case where a large-volumed contact member such as honeycomb-shaped and sponge-shaped plastic is used, the nets 30 may be unnecessary.

The top of each assembly 22,24 is disposed at a position slightly below the outlet 16. Each partition 26 is fixed to the second assembly 24 and extends therefrom to a position above the inlet 14.

Each of the second assemblies 24 except the second assembly at the final stage of process is provided with a supply pipe 36, an air-flowing pipe 38 for blowing out air supplied from the supply pipe 36, and a pair of guides 40,42 for introducing the air blown out from the air-flowing pipe 38 to the second assembly 24. Each supply pipe 36 extends vertically through the second assembly 24 is supported on the framework 28. Each air-flowing pipe 38 extends transversely of the purifier tank 12 at a position between the second assembly 24 and the bottom of the tank 12 and is fixed to a lower end of the supply pipe 36. The guide 42 extends transversely of the purifier tank 12 at the downstream side of the downstream side of the air-flowing pipe 38 and is fixed to the framework 28.

Figure 5:
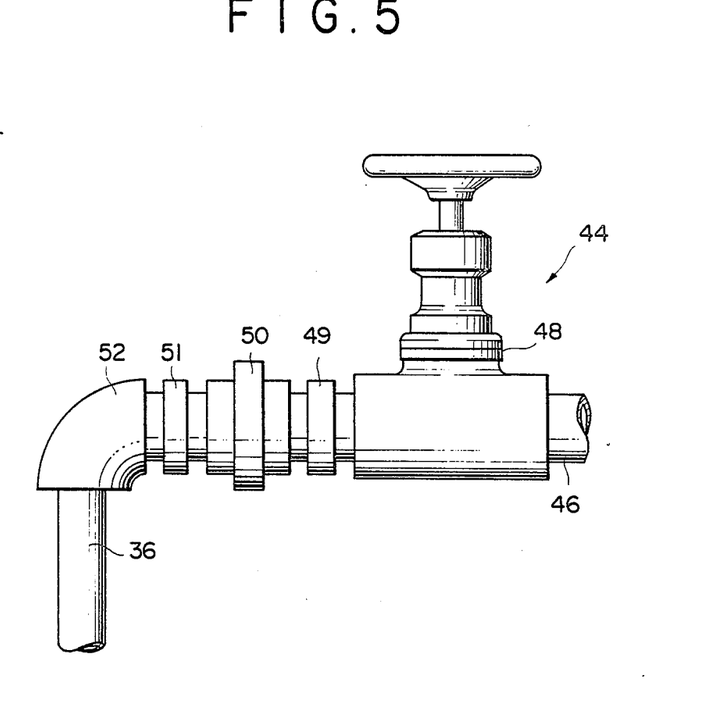
FIG. 5 shows an example of a valve unit.

Each supply pipe 36 is bent transversely outwardly of the purifier tank 12 at a position above the contact members 18 and is then bent upwardly, as shown in FIG. 3. Each supply pipe 36 is connected at its upper end to a pipe 46 by means of a valve unit 44. As shown in FIG. 5, each valve unit 44 is cnnnected to the pipe 46, and includes a globe valve 48 for open and close the flow passageway of the air to be supplied to the supply pipe 36, a union coupling 50 connected to the globe valve 48 via a nipple 49, and an elbow 52 detachably connected to the supply pipe 36. Each pipe 46 is connected to a common blower installed on the ground (not shown).

An air-lift pump 56 is fixed to the second assembly 24 of the contact member 18 at the final stage of process for circulating the sewage at the lower portion of the second assembly 24 to the vicinity of the inlet 14 via a circulation pipe 54. The air-lift pump 56 is supported on the framework 28 of the second assembly 24 of the final-stage contact member 18. A pipe 58 for supplying air to the air-lift pump 56, like the pipe 36 for supplying air to the air-flowing pipe 38, is connected at its upper end to a non-illustrated pipe (which is connected to the blower) by means of a non-illustrated valve unit. This non-illustrated valve unit, like the valve unit 44, is separable and includes a globe valve, a union coupling. a nipple, and an elbow.

The circulation pipe 54 and the air-lift pipe 56 are separably connected to each other by means of a pipe coupling (not shown). Though there is no illustration in the drawings, the circulation pipe 54 is provided with a plurality of pipes which correspond to the first and second assemblies 22,24 and which are separably connected to each other by means of a pipe coupling.

Disposed at the top of the purifier tank 12 are a plurality of first grids 60 individually corresponding to the first assembly 22, and a plurality of second grids 62 individually corresponding to the second assembly 24. Each of the first and second grids 60,62 is detachably supported on a stepped portion 13 formed at the inside of the purifier tank 12, as shown in FIG. 2. Each of the first grids 60 has a cross-sectional area substantially equal to the cross-sectional area of the first assembly 22 of the contact member 18, and is disposed above the first assembly 22. Each of the second grids 62 has a cross-sectional area substantially equal to the cross-sectional area of the second assembly 24 of the contact member 18, and is disposed above the second assembly 24.

A closure means 64 for closing the opening of the purifier tank 12 is detachably supported on each of the first and second grids 60,62. The closure means 64 includes a plurality of first closures 66 individually corresponding to the first assembly 22 and a plurality of second closures 68 individually corresponding to the second assembly 24. The individual first closures 66 are supported on the respective first grids 60, while the individual second closures 68 are supported on the respective second grids 62. The second closure 68 is composed of three closure members disposed in succession transversely of the purifier tank 12. A mass of soil or earth 70 is filed up on each closure 66,68.

A closing unit such as shutter horizontally movable to close the opening of the purifier tank 12 may be used for substitute for the grids and closures.

On the ground, there is laid a pair of rails 72 extending longitudinally of the purifier tank 12 at opposite sides thereof. A portal crane 74 is mounted on the rails 72 and is movable therealong when it is necessary to inspect and repair the clarification device 10.

While the clarification device 10 is operating, compressed air is supplied from the blower to the air-flowing pipe 38 and the air-lift pipe 56 continuously or intermittently.

The air supplied to each air-flowing pipe 38 is blown out therefrom in the form of bubbles, which are introduced to the second assembly 22 by the guides 40,42 and then rise in the second assembly 22 to raise sewage therein. Thus, the sewage in the second assembly 24 is mixed up with the bubbles and rise together with the bubbles in the second assembly 24. As the bubbles blown out from the air-flowing pipe 38 are introduced to the second assembly 24 by the guides 40,42, sewage in the second assembly 24 rises surely, and the sewage at the bottom of the purifier tank 12 is sucked into the space between the guides 40,42 to rise in the second assembly 24.

The air supplied to the air-lift pump 56 rises therein to thereby cause the sewage in the air-lift pump 56 to rise. As a result, the sewage at the outlet-side bottom of the purifier tank 12 is sucked together with deposit into the air-lift pump 56 and is then circulated to the vicinity of the inlet 14 via the circulation pipe 54.

Because the sewage at the upper portion of each contact member 18 is prevented by the partition 26 from flowing from the upper portion of the first assembly 22 directly to the upper portion of the second assembly 24, and vice versa, such sewage flows downwardly in the first assembly 22 and then rises in the second assembly 24. While passing through the first and second assemblies 22,24, the sewage contacts the contact material 34 to receive the action of purification by microorganisms attached to the contact material 34.

As discussed above, the sewage supplied to the tank 12 via the inlet 14 passes the contact members 18 one after another from the inlet side to the outlet side, and then is returned to the vicinity of the inlet 4 as circulated by the air-lift pump 56. After having passed through the successive contact member 18 several times, the sewage finally flows out of the purifier tank 12 from the outlet 16.

Since the sewage passes through each contact member 18 several times and passes through the second assembly 24 of the final-stage contact member 18, the processed sewage which flows from the outlet 16 is a highly purified supernatant water. The amount of the processed sewage which flows from the outlet 16 is equal to the amount of unprocessed sewage supplied to the inlet 14.

During the use of the clarification device 10 for a long period of time, filmy or membraneous webs are developed on the nets 30 of each assembly 22,24 except the nets at the top and the bottom of the assembly due to the growth of microoganisms attached to the nets 30. The path of the sewage flowing in each contact member 18 is divided by the webs into two courses of flow, i.e., a course passing through the first assembly 22 and a course passing through the second assembly 24. As a result, the sewage flows downwardly in the first assembly 22 and upwardly in the second assembly 24.

For inspecting the clarification device 10, the closures 66,68 covering the portion to be inspected are removed by the crane 74 so that the operating condition of the purifier tank 12 can be observed.

For repairing the contact member 18, the first or second assembly 22,24 of the contact member 18 to be repaired is removed out of the purifier tank 12 by the crane 74 after the closures 66,68, the grids 60,62 and the pipes of circulation pipe 54, which are all disposed above the contact member 18 to be repaired, have been removed in this order by the crane 74. To return the contact member 18 in the purifier tank 12, the contact member 18 is placed in its original position, by the crane 74, whereupon the closures 66,68, the grids 60,62, and the pipes of the circulation pipe 54 are placed in the reverse order in their respective original positions by the crane 74. The repair of the air-flowing pipe 38 may be conducted in the same manner.

For taking the first or second assembly 22,24 into and out of the purifier tank 12, a rope is threaded through the engaging arch-shaped members 32 mounted on the top of the assembly 22,24 and is then hung from a hook of the crane 74. Each closure 66,68 and each grid 60,62 may be provided with engaging members similar to the engaging member 32 to facilitate taking them into and out of the purifier tank 12.

When the second assembly 24 supported the supply pipe 36 and the air-flowing pipe 38 is to be removed out of the purifier tank 12, the supply pipe 36 is separated from the pipe 46 by means of the valve unit 44. When the final-stage second assembly 24 supporting the air-lift pump 56 is to be removed out of the purifier tank 12, the pipe 58 is separated from a non-illustrated pipe connecting the pipe 58 with a non-illustrated blower.

Figure 6:
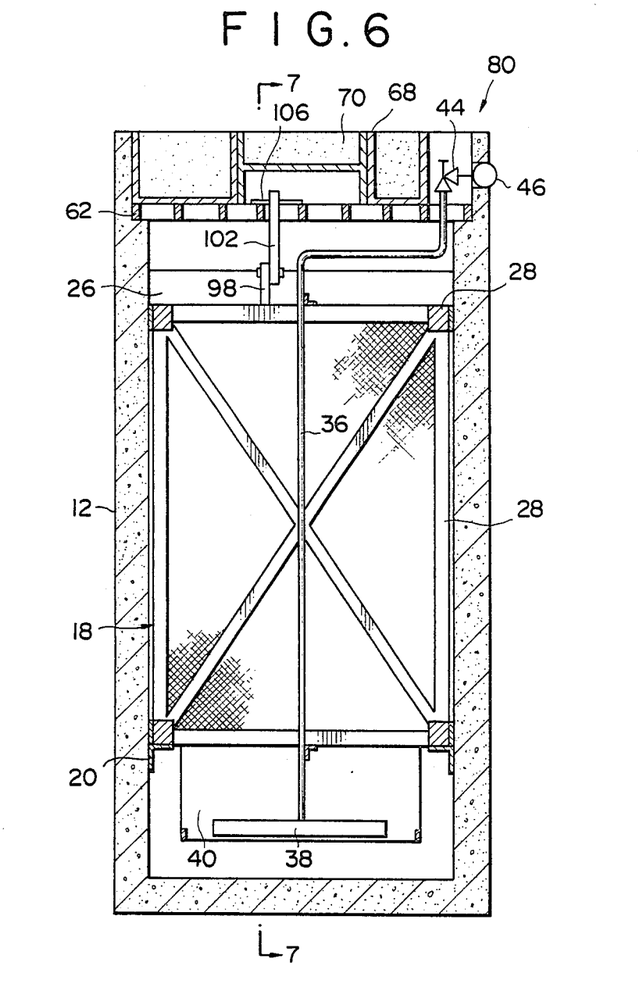
FIG. 6 is a cross-sectional view, on an enlarged scale, similar to FIG. 3, but showing another embodiment of the present invention.
Figure 7:
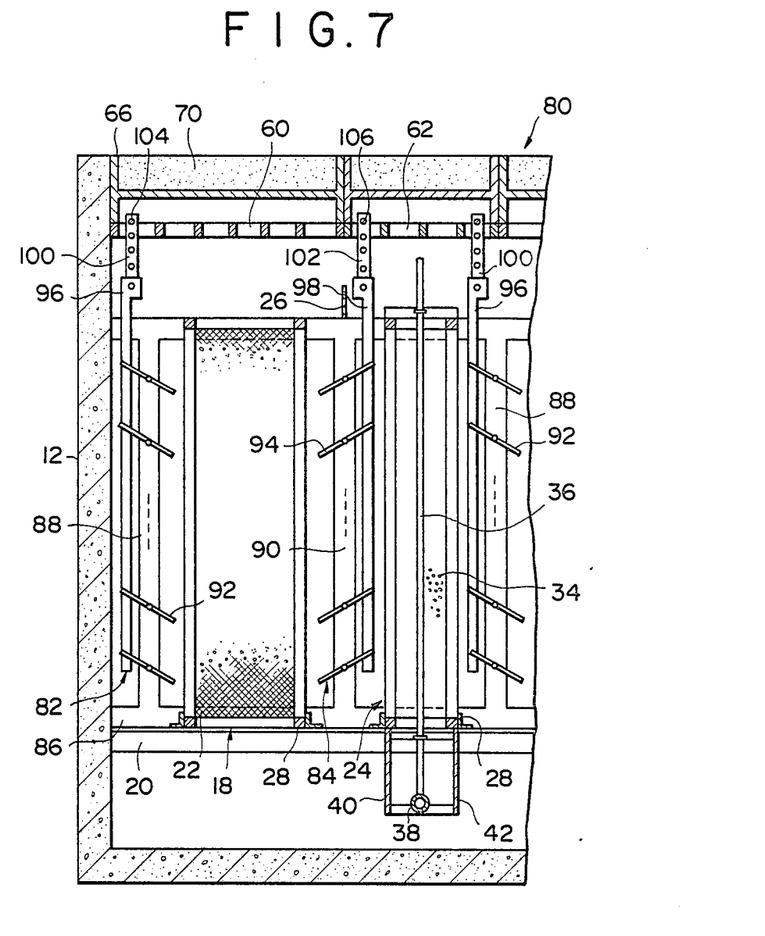
FIG. 7 is a cross-sectional view taken along line 7—7 of FIG. 6.

In a modified sewage purifier or clarification device 80 shown in FIGS. 6 and 7, adjacent contact members 18 in the clarification tank or purifier tank 12 are spaced from each other, and the first and second assemblies 22,24 also are spaced from each other. A flow-path control unit 82 is disposed between the adjacent contact members 18 for directing the sewage flow therebetween to the upstream side or downstream side depending on the direction of the sewage flow. A similar flow-path control unit 84 is disposed between the first and second assemblies 22,24 for directing the sewage flow therebetween to the upstream side or downstream side depending on the direction of the sewage flow.

Each of the flow-path control units 82,84 includes a common framework 86 supported by the elongated bars 20. The framework 86 has a plurality of pairs of supports 88 extending vertically and confronting each other across the space between the contact members 18, and a plurality of pairs of supports 90 extending vertically and confronting each other across the space between the first and second assemblies 22,24. A plurality of blades 92 are mounted on the supports 88 at vertically spaced positions, each blade 92 being rotatable on a horizontal axis. Likewise, a plurality of blades 94 are mounted on the supports 90 at vertically spaced positions, each blade 94 being rotatable on a horizontal axis.

Each blade 92,94 supported on the supports 88,89 is pivotally connected to a vertically extending connecting strip 96,98 centrally transversely of the purifier tank 12. An elongated plate 100,102 having a plurality of holes is pivotally connected to the upper end of the connecting strip 96,98. A locking pin 104,106 is inserted in one of the holes in the plate 100,102 for selectively determining the angle of inclination of the blades 92,94 with respect to the horizon.

Each blade 92,94 is locked by the connecting strips 96,98, the strips 100,102 and the locking pins 104,106 in such a posture that the first-assembly side of the blades 92,94 is disposed below the second-assembly side thereof. The angle of inclination of each blade 92,94 with respect to the horizontal plane can be selectively determined by choosing one of the holes in the strips 100,102, through which the locking pins 104,106 are to be inserted.

With each blade 92,94 thus inclined (FIG. 7), the flow-path control units 82,84 direct the downward sewage flow to the first-assembly side, and direct the upward sewage flow to the second assembly side. As a result, the sewage flowing in the first assembly 22 and the sewage flowing in the second assembly 24 are prevented from being mixed with each other.

In the clarification device 80, like in the clarification device 10, each assembly 22,24 can be removed out of the purifier tank 12 by the crane after the corresponding closure and grid have been removed.

Figure 8:
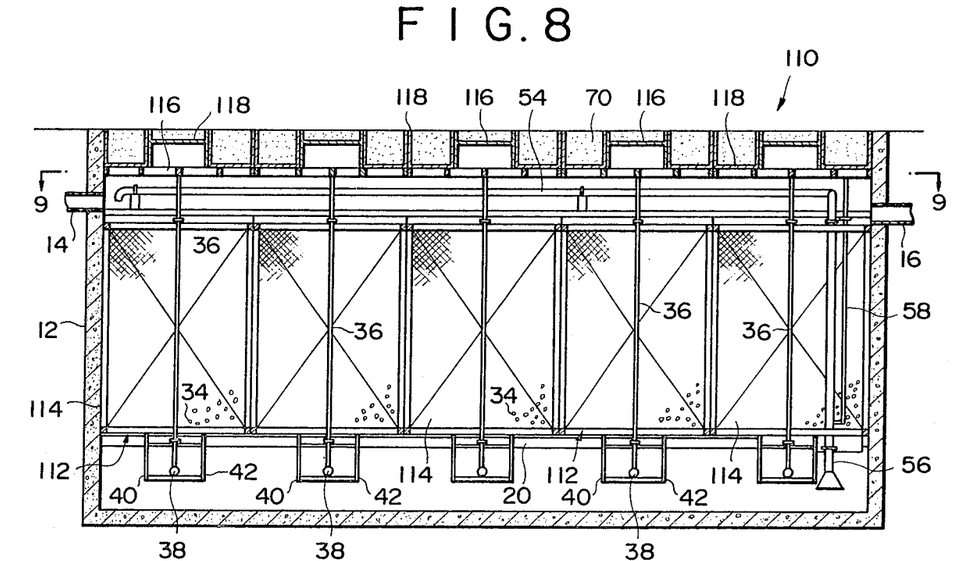
FIG. 8 is a vertical cross-sectional view showing a further embodiment of the present invention.
Figure 9:
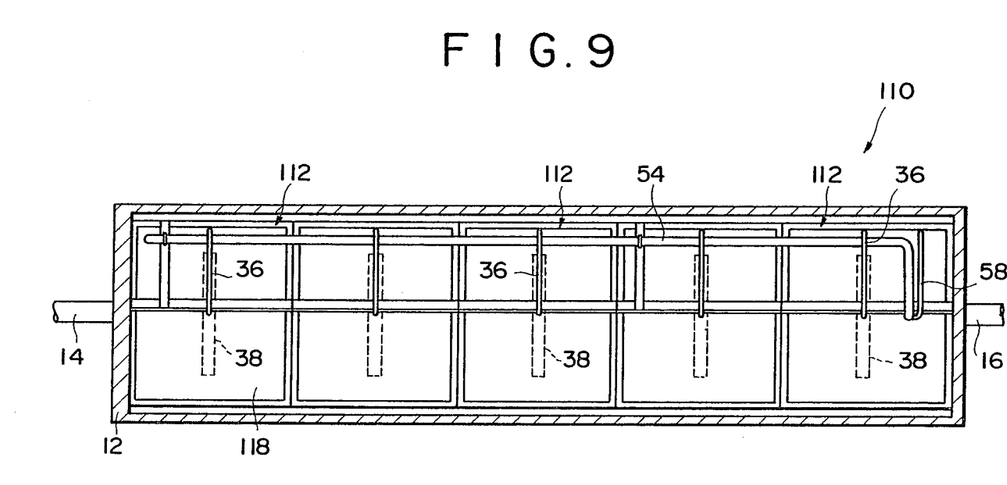
FIG. 9 is a cross-sectional view taken along line 9—9 of FIG. 8.

FIGS. 8 and 9 illustrate a sewage purifier or clarification device 110 of the aeration type embodying the present invention. Each contact member 112 of the device 110 consists of an assembly 114 including a framework in the form of recangular parallelpiped composed of elongated frame members, nets covering the openings of the framework, and a plurality of arch-shaped engaging members mounted on the top of the framework. A plurality of contact materials 34 are received in the space defined by the nets of the assembly 114. Each assembly 114 is supported by a pair of elongated bars 20 so as to be removed out of the purifier tank 12 through the opening therein, the bars 20 being fixed to the side wall of the tank 12. The adjacent assembies 114 are in contact with each other. Each assembly 114 may be further subdivided.

The opening of the device 110 is covered by a plurality of grids 116 and a plurality of closures 118. The grids 116 and the closures 118 are divided into groups each including a grid and a plurality of closures and corresponding to a respective one of the assemblies 14. Each grid 116 and each closure 118 are detachably supported on the assembly 114.

Fixed to each assembly 114 are a supply pipe 36, an air-flowing pipe 38 for blowing out air supplied from the supply pipe 36, and a pair of guides 40,42 for introducing the air blown out from the air-flowing pipe 38 to the assembly 114. An air-lift pump 56 is fixed to the final-stage assembly 114 for circulating the sewage in the lower portion of the assembly to the vicinity of the inlet 14 via the circulation pipe 54. The supply pipe 36, the air-flowing pipe 38, the guides 40,42, the circulation pipe 54 and the air-lift pump 56 are all similar to the corresponding parts of the device 10.

In the device 110, aeration occurs from the lower portion of each contact member 112 so that bubbles blown out from the air-flowing pipe 38 rises in the contact member 112 to thereby raise the sewage in the contact member 112. The sewage at the bottom of the purifier tank 12 is thus raised by the bubbles, while the sewage at the top of the tank 12 sinks by its own weight. While the sewage thus moves vertically in the purifier tank 12, the sewage contacts microorganisms attached to the contact materials to receive the action of purification from the microorganisms.

In the device 110, each assembly 114 can be removed out of the purifier tank 12 by the crane after the corresponding closures and grids have been removed.

What is claimed is:

1. A clarification device comprising:

a purifier tank having an inlet and an outlet for sewage and opening at its top;

contact means to which micro-organisms for purification are to be attached and which is disposed in said purifier tank at a position spaced upwardly from the bottom of said purifier tank;

air-flowing means disposed between said contact means and said bottom of said tank;

air-supplying means fluidly connected to a source of air and extending vertically in said purifier tank for supplying air to said air-flowing means;

said contact means having a first assembly and a second assembly disposed from each other so as to be removable out of said purification tank through said opening;

a flow path control unit to direct sewage flowing between said first and second assemblies toward either said first assembly or said second assembly according to the direction of the flow thereof;

said flow path control unit including a framework having at least a pair of supports extending vertically and confronting each other across the space between said first and second assemblies;

a plurality of blades supported on both said supports rotatably on a horizontal axis and spaced vertically from each other;

an angle determining means mutually connecting said blades with each other for selectively determining the angle of inclination of said blades with respect to the horizontal plane; and said air-flowing means and said air-supplying means being supported on said second assembly.

2. A clarification device according to claim 1, further comprising:

a valve disposed in said purification tank to connect the pipe and said air-supplying means detachably.

3. A clarification device according to claim 1, further comprising:

a grid detachably disposed on top of said purifier tank;

a closure supported on the grid detachably therefrom for closing the opening of said purifier tank;

said angle determining means provided with a connecting member extending vertically to mutually connect said blades and an engaging member releasably engaged with said grid to selectively fix the position of the connecting member.

4. A clarification device comprising:

a purifier tank having an opening at its top and including an inlet and an outlet for sewage;

contact means to which micro-organisms for purification are to be attached and which is disposed in said purifier tank at a position spaced upwardly from the bottom of said purifier tank;

air-flowing means disposed between said contact means and said bottom of said tank;

air-supplying means fluidly connected to a source of air and extending vertically in said purifier tank for supplying air to said air-flowing means;

means for closing said opening of said purifier tank;

said contact means including at least one assembly disposed so as to be removed out of said purifier tank through said opening and a second assembly disposed at the outlet side of said first assembly so as to be removed out of said tank through said opening;

a flow path control unit between the first and the second assemblies adjacent to each other for directing sewage flowing between said first and second assemblies toward either said first or second assembly side according to the direction of its flow;

said closing means including a detachable first closure disposed above said first assembly for covering the first part of said opening, and a detachable second closure disposed above said second assembly for covering a second part of said opening;

said flow path control unit including a framework having at least a pair of supports confronting each other across the space between said first and second assemblies and extending vertically;

a plurality of blades supported on both said supports rotatably on a horizontal axis and vertically separated from each other;

an angle determining means for selectively fixing the angle of inclination of said blades with respect to the horizontal plane; and said air-flowing means and said air-supplying means being supported by said second assembly so as to be removed out of said purifier tank together with said second assembly.

5. A clarification device according to claim 4, wherein said air-flowing means includes an air-flowing pipe disposed below said second assembly and attached to said second assembly to receive the air supplied from said air-supplying means and to blow out said air, and a guide for introducing the blown out air from said air-flowing pipe to said second assembly.

6. A clarification device according to claim 4, further comprising supporting means disposed on the top of said purifier tank and supporting said closing means, said supporting means including a detachable first grid supporting said first closure, and a detachable second grid supporting said second closure and detachable independently of said first grid.

7. A clarification device according to claim 4, wherein said air-flowing means is disposed below said second assembly and is supported thereon, while said air-supplying means is supported on said second assembly.

8. A clarification device according to claim 4, wherein said contact means is provided with a partition for preventing the sewage at an upper portion of said first assembly from flowing directly to an upper portion of said second assembly without passing through said first and second assemblies.

9. A clarification device according to claim 4, wherein said closing means are disposed on a grid detachably mounted on the top of said purifier tank, and said angle determining means includes a connecting strip extending vertically and supporting said blades, and locking means connected to an upper end of second connecting strip and releasably engaged with said grid for locking said connecting strip in a selected level.

10. A clarification device according to claim 7, wherein further comprising means for circulating the sewage from the outlet-side bottom of said purifier tank to the vicinity of said inlet.

11. A clarification device according to claim 4, further comprising flow-path control units disposed one in a space between the adjacent contact means and also one in a space between said first and second assemblies for directing the sewage flow between said contact means and between said first and second assemblies, respectively, to the upstream side or to the downstream side depending on the direction of the sewage flow.

* * * * *